Figure 1:
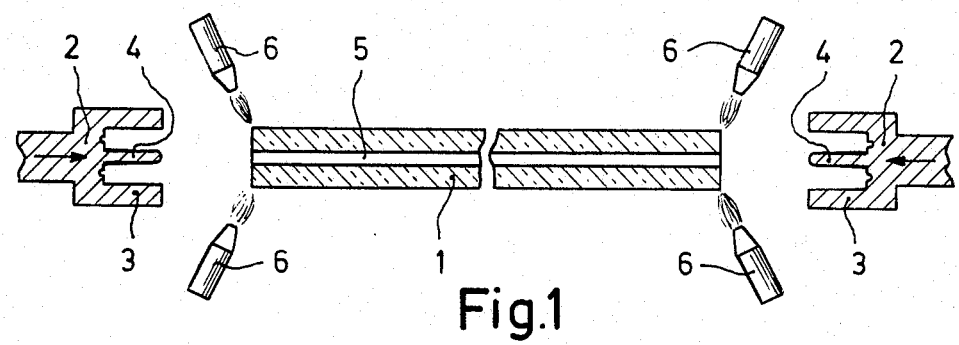

United States Patent [19]

Haans

[11] 3,913,032

[45] Oct. 14, 1975

[54] GAS DISCHARGE LASER AND METHOD OF MANUFACTURING SAME

[75] Inventor: Petrus Franciscus Antonius Haans, Eindhoven, Netherlands

[73] Assignee: U.S. Philips Corporation, New York, N.Y.

[22] Filed: July 11, 1973

[21] Appl. No.: 378,268

[30] Foreign Application Priority Data
July 21, 1972   Netherlands ................... 7210089

[52] U.S. Cl. ..................... 331/94.5 G; 331/94.5 D
[51] Int. Cl.² ..................... H01S 3/22; H01S 3/03
[58] Field of Search ........ 331/94.5; 330/4.3; 350/50

[56] References Cited
UNITED STATES PATENTS
3,735,281   5/1973   Bouhuis et al. ................ 331/94.5 G
3,771,066   11/1973   Burgwald et al. .............. 331/94.5 S

*Primary Examiner*—Robert J. Webster
*Attorney, Agent, or Firm*—Frank R. Trifari

[57] ABSTRACT

On a thick-walled capillary tube rounded edges are pressed at either end. Double-conical surfaces are ground on said rounded edges so that a fitting edge which is very obtuse in cross-section is obtained for laser mirrors of a He-Ne laser of an economic construction.

4 Claims, 4 Drawing Figures

GAS DISCHARGE LASER AND METHOD OF MANUFACTURING SAME

The invention relates to a gas discharge laser in which the reflector plates are directly supported by a hollow insulator and in which the fitting edges for said reflector plates each consist of two ground conical surfaces at each end of the hollow insulator which are centered relative to the axis thereof and are directed opposite to each other in such manner that the fitting edges in cross-section are obtuse. The invention furthermore relates to a method of manufacturing such a gas discharge laser.

A construction as described above forms inter alia the subject matter of the prior U.S. Ser. No. 528,507. This application relates to an infrared laser for a wavelength of 10.6 /$\mu$. The diameter of the quartz tube on which the fitting edges are ground is 18 mm, the length is 2 m. Half of the apical angle of each of the conical surfaces is 60° to 75°. The parallelism of the two fitting edges is better than approximately 30°. For tubes having a considerably smaller outer diameter and an inner diameter of at most a few millimetres, such a construction is not suitable because with said small inner diameter the conical surfaces cannot be ground in one clamping.

In the prior U.S. Pat. No. 3,735,281, double-conical fitting edges are ground on a quartz tube of 35 mm diameter and 130 mm length. A quartz tube of 8 mm outer diameter and 1 mm inner diameter and a slightly smaller length is present inside said tube. The inner tube is connected to electrode spaces outside the wide tube by transverse tubes. The discharge of a He-Ne-laser for 6328 A occurs through the narrow tube. In connection with the achievable amplification and the restriction to one transversal mode of oscillation, the inner diameter for such a laser must be small. The fitting edges on the outer tube are centered relative to the channel in the inner tube. In clamping on the grinding machine, the centres are placed in the inner tube so that the grinding edges are centered relative to the inner tube. The described construction necessitates the use of reflector plates which are not only considerably larger than the diameter of the discharge channel but in addition are much larger than the outer diameter thereof. The result of this is that the price of such a construction is rather high also as a result of the two tubes inside each other. This is a drawback in particular for use in non-professional apparatus.

It is the object of the invention to provide a construction for a gas discharge laser which is simple of construction and, like the known constructions, can be manufactured with simple auxiliary means so that the price can be maintained low.

According to the invention, in a gas discharge laser in which the reflector plates are directly supported by a hollow insulator and in which the fitting edges each consist of two ground conical surfaces at one end of the hollow insulator which are centered relative to the axis thereof and are directed opposite to each other in such manner that the fitting edges in cross-section are obtuse, the insulator is formed by a narrow glass tube which has a comparatively large wall thickness relative to its bore in which the laser discharge occurs, the ends of said tube being provided with annular pressed rounded edges or ridges having ground double conical fitting edges the cross-section of which is obtuse with an angle exceeding 170° and the width of which is smaller than the pressed rounded edges.

In pressing the rounded edges, moulds are used of the desired shape which, according to the invention, are provided with a central mandril which has a diameter slightly smaller than the inner diameter of the glass tube. In pressing the edges, the softened ends of the tube are slightly compressed and given the smaller diameter of the mandril so that said ends are readily aligned with respect to each other. The mandrils are slightly conical so as to enable detachement. During pressing, the ends of the insulator are preheated until they are sufficiently softened. The moulds are not preheated. The advantage of this is that the capillary tube may be used with a considerably larger tolerance of the inner tube and also of the straightness than in a capillary tube which would have the same inner diameter throughout the length as at the ends. Diaphragms of a very readily defined diameter which restrict the operation of the laser to one single transversal mode are thus formed in this construction during pressing. The ends of the inner side are simultaneously rounded during the pressing process. Said roundings are necessary to be able to turn the tube on fixed centers. In the case of a non-rounded, sharp or crumbly inner side as they are formed upon grinding ends of tubes, it would not be readily possible to turn the tube on the centres.

The grinding of the obtuse fitting edges is carried out by means of small high-speed wheels the axes of which initially intersect the axis of the tube at right angles. In the case of a slowly rotating tube, the wheels are provided at either end so closely to the pressed edges that the wheels which are not yet driven start rotating. The wheels are then driven and turned over an angle to maximum 5° in both directions about an axis which extends at right angles to both the axis of the wheels and to the axis of the tube and which is present at a distance from the latter which is equal to half the diameter of the top of the pressed edge. In order to be able to approach the axis of the tube sufficiently closely and to use centers having not too small an apical angle, said centers are flattened on the side facing the wheels.

The construction according to the invention results in a fitting of a sufficient accuracy for the reflector plates of a simple He-Ne-laser in the visible range. As a result of the small diameter of the fitting edges, only small reflector plates of a great accuracy, flat or concave, need be ground which favourably influences the price. The axis of the laser extends at right angles to the two fitting surfaces to within 1' and also the parallelism is better than 1', which, in connection with the building in in an apparatus and the occurring bending forces, is sufficient.

Figures 2, 3:
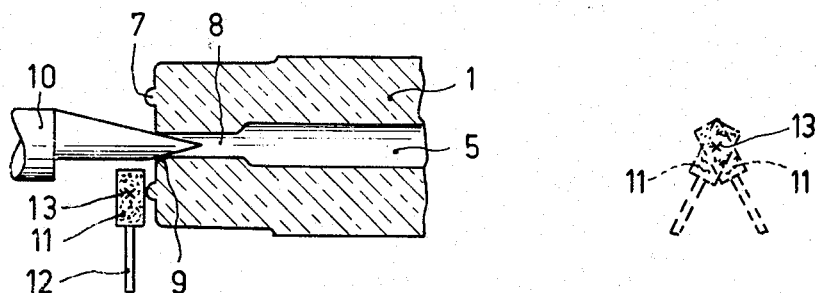
Figure 4:
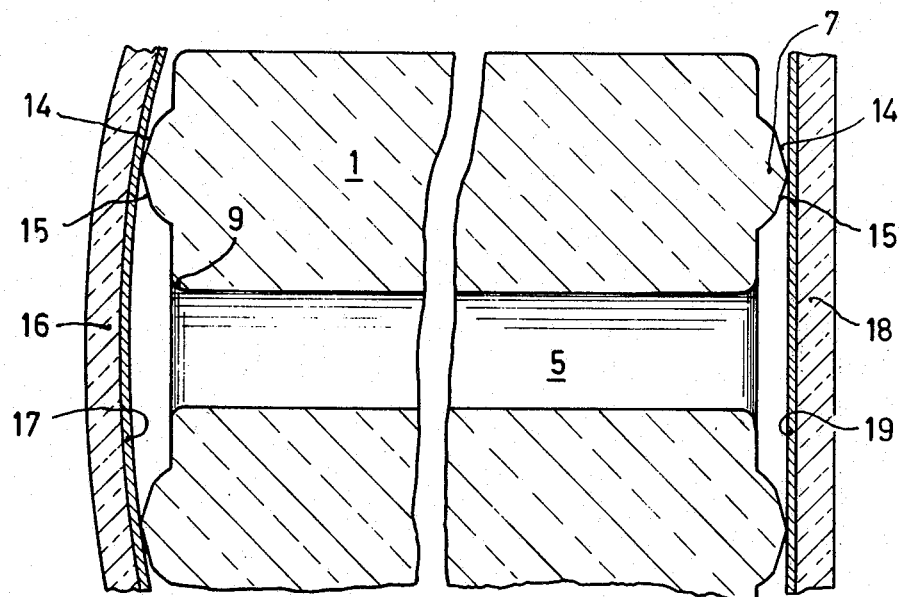

The invention will be described in greater detail with reference to the drawing in which FIGS. 1, 2 and 3 show a number of stages during the processing of the hollow insulator, while FIG. 4 shows the fitting edges with the reflector plates provided thereon.

Reference numeral 1 in FIG. 1 denotes a tube of borosilicate glass, 25 cm long, 9 mm outer diameter. In deviation from the drawing, said tube is in a vertical position between two parallel press moulds 2 which are present in the elongation of each other and which can be moved towards each other truly axially by means of a pressure device not shown. Centrally in each mould is a central mandril 4 having a diameter of 1.4 mm, while the inner diameter of the aperture 5 in the tube is 1.7 mm. The central mandril has half an apical angle of 30¹. After the ends of the tubes have been softened sufficiently by burners 6, the moulds are moved towards each other, the pressed edges 7 (see FIG. 2) being formed and the associated end of the tube 8 being given a diameter of 1.4 mm and the end being rounded at 9.

FIG. 2 shows how the center 10 is introduced into the tube at one end and how a grinding wheel 11 having a shaft 12 is pressed against the pressed edge 7. The grinding wheel 11 cannot only rotate at high speed about its own axis 12 but also about the axis which is denoted at 13 at right angles to the plane of the drawing.

FIG. 3 shows in broken lines how, with a larger deflection than is the case actually, the wheel 11 can assume its extreme positions.

FIG. 4 shows how the two reflector plates have been laid on the fitting edges. The pressed edges have an outer diameter of 8 mm and a height of 0.2 mm. The ground edges 14 and 15 which have each been obtained by rotating the wheel 11 through an angle of 1°, have a width of 75 /μ. Approximately 50 /μ of the height of the pressed edge 7 is ground away. The concave reflector plate 16 supports the dichroic layer 17 and the flat reflector 18 supports the dichroic layer 19. The parallelism of the lines of intersection of the conical surfaces 14 and 15 at the two pressed edges lies within 40°.

Upon grinding the edges 14 and 15, the tube 1 is rotated at a speed of approximately 60 r.p.m. while the grinding wheels 11, diameter 5 mm, have a number of revolutions of 54,000 per minute. Grinding of the fitting edges takes approximately 20 seconds.

What is claimed is:

1. An arrangement, particularly for a gas discharge laser having reflector plates, comprising an elongated glass tube interposed between the reflector plates and axially centered therebetween, said tube having a wall thickness relatively larger than its bore, and ends being in contact with said reflector plates, said ends being provided with annular ridges forming fitting edges for said tube in the laser against the reflector plates, said ridges including a first portion having a cross-section which includes an obtuse angle exceeding 170°, and a rounded second portion, said first portion being smaller in width than said rounded second portion.

2. An arrangement as defined in claim 1, wherein the diameter of said bore is smaller near said ends than over the remainder of the length of said glass tube.

3. An arrangement as defined in claim 1, wherein the edges between said bore and said ends are rounded.

4. An arrangement as defined in claim 1, wherein the edges between the outer surface of said tube and said ends are rounded.

* * * * *

UNITED STATES PATENT AND TRADEMARK OFFICE
CERTIFICATE OF CORRECTION

PATENT NO. : 3,913,032
DATED : October 14, 1975
INVENTOR(S) : PETRUS FRANCISCUS ANTONIUS HAANS It is certified that error appears in the above–identified patent and that said Letters Patent are hereby corrected as shown below:

Column 1, line 14, change "inter alia" to --_inter alia_--.

Column 2, line 41, change "centers" to --centres--

Signed and Sealed this sixteenth Day of March 1976

[SEAL]

Attest:

RUTH C. MASON
Attesting Officer

C. MARSHALL DANN
Commissioner of Patents and Trademarks